Patented Apr. 17, 1951

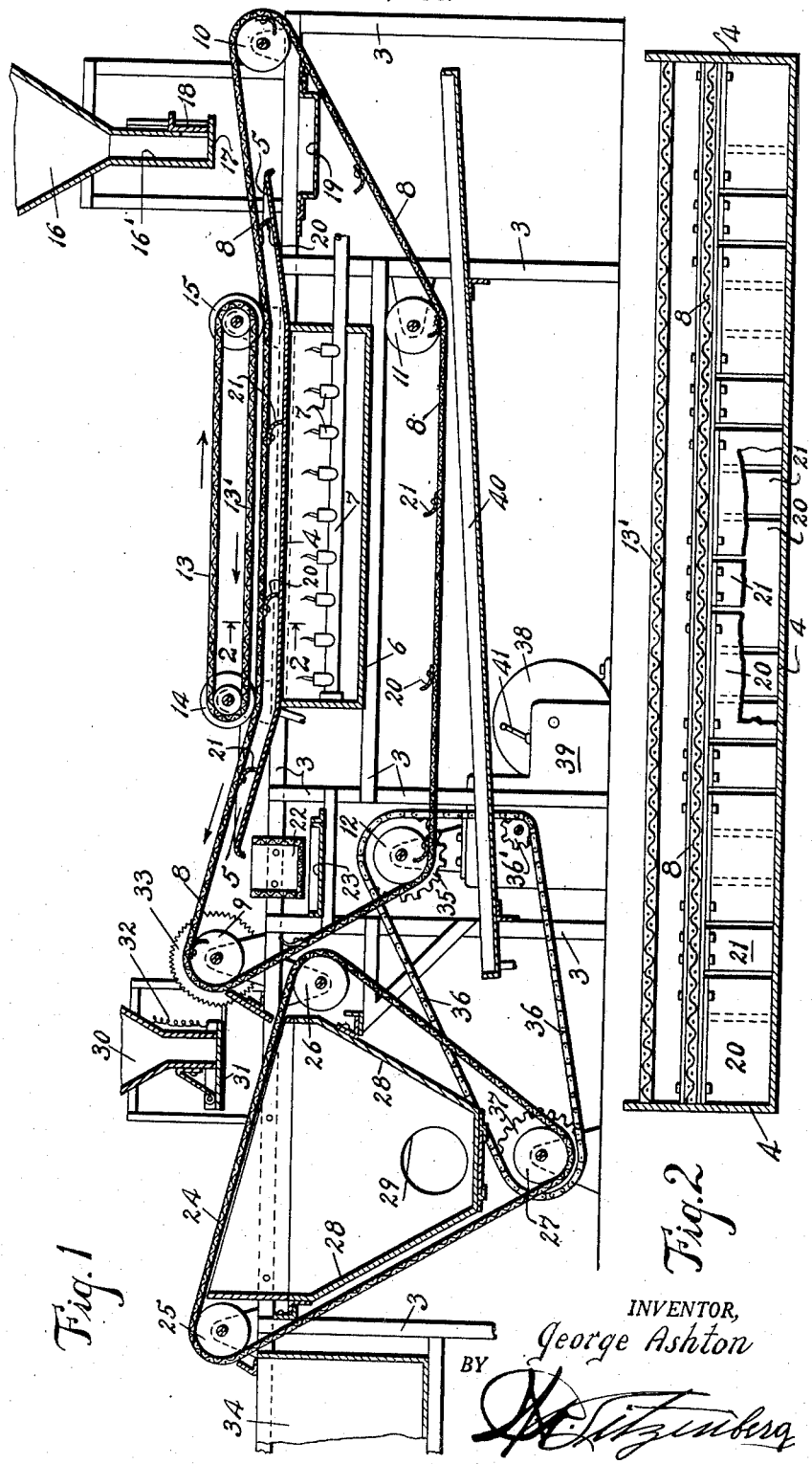

2,549,283

UNITED STATES PATENT OFFICE 2,549,283

CONTINUOUS COOKING APPARATUS

George Ashton, Los Angeles, Calif.

Application December 22, 1947, Serial No. 793,125

2 Claims. (Cl. 99—408)

This invention relates to continuous cooking apparatus, and more particularly to an apparatus designed to carry matter to be cooked through a cooking fluid, whereby said matter is cooked by a continuous process as it is moved through the cooking medium.

Among the salient objects of this invention are:

To provide in an apparatus of the character referred to a conveyor of open mesh material with means for moving it through a container of deep oil or deep fat or other cooking fluid suitable for the matter to be cooked, and which conveyor is provided with scraping means on its under side for continuously scraping the bottom of said container as it moves therethrough to remove particles of food which may fall through the conveyor and the burning of which causes carbon and renders the cooking fluid useless;

To provide in such an apparatus, on the under side of the conveyor, a plurality of scraping members arranged in staggered relationship so that a following scraper member will move in alinement with a gap or juncture of the preceding scraper members, thus insuring that the entire surface of the bottom of the container will be continually cleaned of particles or solid matters which might burn and cause deterioration of the cooking fluid;

To provide in combination with such a continuous cooking apparatus means for salting the matter to be cooked as it emerges from the cooking fluid before it cools thus insuring a more perfect adhesion of the salt to the product;

To provide in combination with a continuous wire mesh conveyor a cooperating endless conveyor, the lower lap of which runs in proximity to the supporting surface of the main conveyor, whereby to hold the matter on the main conveyor to be cooked so that it will move in a submerged condition through the cooking fluid;

To provide in combination with such an apparatus means for applying suction through a conveyor for the cooked matter, as it is carried on another conveyor, whereby to remove all fumes, odors or other matter or moisture from the cooked product;

Other objects and advantages of the invention will appear from the following more detailed description of one practical embodiment of the invention, taken with the accompanying drawings illustrating the same, and in which Figure 1 is a longitudinal sectional view through an apparatus embodying the invention; and Figure 2 is a cross sectional view thereof taken on the line 2—2 on Fig. 1, showing the conveyors and the scraping members.

In the drawings, the supporting structure or frame is designated by the reference numerals 3, 3, and can be of any suitable construction and arrangement for supporting the operating mechanism.

Supported in the top of this frame is an elongated pan or kettle or container 4, to hold the cooking fluid, such as deep oil, deep fat, or any other cooking fluid suitable for the matter to be cooked. Said container tapers upwardly at its opposite ends so that a conveyor can be moved down into and through said container and up out of it at the other end, said tapering ends being designated 5, 5.

Supported under said container is a housing 6, for a series of heating elements, shown to be gas burners 7, 7, in the present embodiment of the invention, but any suitable heating means for the cooking fluid can be used.

An endless conveyor 8 is shown operating over suitable pulleys or rollers, as 9, 10, 11 and 12, mounted on the supporting frame, 3, 3, as shown, and moving through said cooking container and around under the same as illustrated. In the present embodiment said conveyor is of wire mesh of such material as will be unaffected by the cooking material.

Mounted above said conveyor and said container is an endless member 13, running over two pulleys or rollers, as 14, 15, with its lower lap 13' moving adjacent the top lap of the main conveyor, as clearly illustrated, whereby to hold the matter being cooked, whether nuts, or other matter in a flat layer on the main conveyor as it is moved through the cooking fluid in the cooking pan or container 4.

Supported on the frame, at the right hand end thereof, is a feed hopper 16, with a feed spout 16', with a bottom 17, and a lift door 18, which can be raised to different heights to permit the nuts or matter to be cooked to fall out and upon the conveyor 8 and to spread thereon before it reaches the conveyor. A pan 19 is mounted under the end of said conveyor, at the feed station, whereby siftings can fall through the conveyor and into this pan and thus not be carried into the cooking fluid.

On the under side of said conveyor 8, I have provided a plurality of scraping members, as 20 and 21, of different widths and arranged in staggered relationship so that one set of scraping members will follow a preceding set of scraping members in such a way as to make sure that the entire surface is scraped. The scraping members are preferably of long and short pieces of blue clock spring material, and by having a plurality of such members they will follow any irregularities on the pan or kettle due to any distortion or other cause by reason of heat.

At the discharge end of said cooking container is a box or receptacle of wire mesh, as 22, with a pan 23 thereunder, to receive the scrapings from the bottom of the cooking container, in a manner clearly illustrated.

The discharge end of said conveyor discharges the cooked matter on to another endless conveyor 24, of wire mesh, or other suitable material, which runs over pulleys or rollers 25, 26 and 27, the top lap, which is the receiving lap of said conveyor, runs over the open top of a box 28, having an opening 29 therein for the connection of the suction end of a blower (not shown) for the purpose of creating a suction down through said discharge conveyor 24, for the purpose of drawing off any odors, vapors or other matter which can and should be withdrawn so as to make the finished product as perfect and edible as possible.

Above this conveyor 24, is a salting device, consisting of a hopper 30, with a hinged bottom 31, normally held closed by a spring 32, the end of said door or bottom projecting to a ratchet wheel 33, and by means of which said bottom is vibrated for sifting salt on to said conveyor and the cooked matter thereon even before it is cooled and thus more effectively seasoning the product.

The finished or cooked product is discharged into a receptacle 34 at the left hand end of the structure.

The main conveyor 8 is driven from the pulley 12, on the same shaft with a sprocket 35, over which runs a sprocket chain 36, running over another small sprocket 36′ and thence over a large sprocket 37, on the same shaft with the pulley or roller 27, around which the conveyor 24 runs.

The mechanism described is motor driven and a motor is indicated, as at 38, connected with a gear reduction box or case 39, at one side of which is a small drive sprocket, heretofore referred to as 36′, driven from the gear box for driving the sprocket chain 36, from which both conveyors 8 and 24 are driven in the manner indicated from pulleys or rollers 12 and 27, respectively.

Supported under said main conveyor 8, and under the heating box 6, is an inclined pan or receptacle 40 to catch any drippings from the main conveyor as it moves under said heating box.

The motor connection and the reduction gear mechanism can be of any suitable and standard type and would have a control lever or shift lever, as at 41, for controlling the drive from the motor to the gear box, and whereby the drive and also the speed can be regulated within the usual arrangement, as may be desired. This, of course, is old and need not be shown in detail.

It is submitted that this method of continuous cooking of nuts and the like has many advantages over the so-called "batch" method inasmuch as it is much easier to maintain the desired temperature of the cooking fluid, whereas, when a large batch of nuts to be cooked is dumped into a kettle of cooking fluid, it is bound to affect the temperature of said cooking fluid and take time to again bring it up to normal temperature.

I claim:

1. In an apparatus of the character described, a container for cooking fluid, means thereunder for heating it, an endless conveyor of wire-mesh mounted to be moved continuously through said cooking fluid therein, to carry matter to be cooked through the cooking fluid, a plurality of spring scrapers on the under side of said conveyor, arranged crosswise thereof and in staggered relationship to scrapers ahead of them, whereby to cover the entire surface of the bottom of said container, means for driving said conveyor, and an endless member above said conveyor and having its lower lap adjacent said main conveyor as they move through the cooking fluid, whereby to hold matter being cooked submerged in the cooking fluid.

2. A continuous cooker for nuts and the like including an elongated container for cooking fluid and having an inclined end floor, heating means therefor, an endless conveyor of wire mesh mounted with means for moving it continuously through said container and said cooking fluid, a member above said conveyor and adjacent thereto to press matter being cooked into the cooking fluid, transversely staggered scraper means on the under side of said conveyor for continuously scraping the bottom of said container, said scraper means being adapted to move the scrapings up the inclined end floor and means for catching the matter scraped up by said scraper means.

GEORGE ASHTON.

REFERENCES CITED

The following references are of record in the file of this patent:

UNITED STATES PATENTS

| Number | Name | Date |
| --- | --- | --- |
| 1,518,206 | Kramer | Dec. 9, 1924 |
| 1,598,435 | Gottschalk | Aug. 31, 1926 |
| 1,737,363 | Ehrhart | Nov. 26, 1929 |
| 1,760,979 | Ferry | June 3, 1930 |
| 1,926,313 | Smith | Sept. 12, 1933 |
| 1,986,897 | Shaw | Jan. 8, 1935 |
| 2,196,991 | Jacobs et al. | Apr. 16, 1940 |
| 2,319,561 | Scharsch | May 18, 1943 |